3,826,613
DETECTION AND TITRATION OF VIRUSES AND ANTIBODIES USING LATEX

Gokaldas C. Parikh and Thomas C. Sorensen, Brookings, S. Dak., assignors to the United States of America as represented by the Secretary of the Navy
No Drawing. Filed Mar. 6, 1973, Ser. No. 338,495
Int. Cl. G01n 31/00
U.S. Cl. 23—230 B                                       10 Claims

ABSTRACT OF THE DISCLOSURE

A method of counting viruses and antibodies, employing uniform diameter, latex particles in a suspension to which an unknown amount of virus particles or antibody molecules is added. The adsorption of the virus particles or antibody molecules on the latex causes agglutination of the latter. The types and amount of agglutination can be determined by using a Coulter Counter. From the sizes and the amounts of the specific aggregates formed, the type and quantity of virus particles or antibody molecules can be determined by comparison with data for known samples. The time for comparison may be reduced by precoating the latex particles with viruses or antibodies before the unknown antibody or virus containing sample is added. Tagging the unknown virus particles with a fluorescently tagged enzyme will also reduce comparison time. Alternatively, the fluorescence of the tagged virus particles can be employed to determine the number of virus particles in an unknown sample.

BACKGROUND OF THE INVENTION

The present invention relates to the detection of viruses and antibodies and especially to a universal and unique method of counting and assaying virus particles or antibody molecules.

Animals, which are exposed to foreign proteins (antigens), produce in their blood and tissue fluids certain soluble substances (antibodies). Such foreign proteins can be supplied, for example, by a microbiological or viral invader, in which case the antibodies serve a protective function. When antigens and antibodies contact under proper conditions, they combine to form a complex that is less soluble than either uncombined. This relatively insoluble complex is discernible to the human eye in varying degrees.

Sometimes, however, the complex size is so small that certain carriers must be employed to aid in detection of the reaction. Various carriers, including but not limited to erythrocytes, bentonite, collodium, quartz, synthetic resins, and latex particles, have been employed to allow macroscopic visualization of the reaction. By employing a specific antigen or antibody in such methods, others have previously been able to qualitatively determine to some extent the presence of the corresponding antibody or antigen. See, e.g., U.S. Pats. Nos. 3,088,875 and 3,697,639. At present, however, there is no universal method to detect, type, and count virus particles and antibody molecules. In the past, viruses have been detected and titrated in tissue culture cells, laboratory animals or by routine serological blood tests; these methods require extensive time for sample preparation and testing and give irregular results due to biological variability and instability associated with living systems.

SUMMARY OF THE INVENTION

In the present invention virus particles or antibody molecules are adsorbed on latex particles of a uniform size. The adsorption causes agglutination of the latex particles which can be qualitatively and quantitatively analyzed by using a Coulter Counter. Various concentrations of different viruses and antibodies produce different, statistically significant changes in latex aggregate patterns and counts. These changes represent a signature for a specific type of virus or antibody and a specific number of virus particles or antibody molecules. The changes may be compared to changes produced when known amounts of virus or antibodies are employed to yield accurate conclusions regarding the number and type of particles or molecules in an unknown sample. To reduce the time for comparison of data, the latex particles may be precoated with a known virus or antibody. Virus classification may also be aided by attempting to tag the unknown virus with a specific enzyme which itself has a fluorescent tag. Alternatively, the fluoresence of the tagged virus particles may be used to determine the number of virus particles.

An object of the present invention is to identify and count virus particles and antibody molecules in a universal manner.

Another object is to detect and titrate viruses and antibodies in a manner susceptible to automation.

Other objects, advantages and novel features of the present invention will become apparent from the following detailed description of the invention.

DESCRIPTION OF THE PREFERRED EMBODIMENTS

The method of the present invention generally involves the use of a suspension of latex particles (polyvinyl toluene $2.02\mu$ diameter) diluted from 10% commercial stock to 1:20,000 dilution in Isoton pH 7.4. A sample containing virus particles or antibody molecules to be typed and counted is added to a predetermined amount of the suspension. The following examples are given to demonstrate the effectiveness of the present invention. These examples are set forth for the purpose of illustration only and are not intended in any way to limit the practice of the invention.

EXAMPLE I

Six sample vials were filled with 20 ml. of diluted latex, and three $100\lambda$ sample counts were taken on a Model F Coulter Counter manufactured by Coulter Electronics, Inc., Hialeah, Fla., to determine the similarity of the suspensions. Before the initial count, the vials were agitated in a flip-flop manner for 10 cycles. The Coulter Counter settings for the initial readings were aperture 16, attenuation 1, orifice diameter $70\mu$, and threshold value 0. Table 1 in the appendix shows the initial particle counts for each of the six sample vials.

Next two milliliters of a sample, having a known amount of virus particles, were added to each of the six sample vials. As shown in Table 1, no virus was added to vials 1 and 2. Various amounts, as indicated, of Western equine encephalitis (WEE) were added to vials 3–6. The actual number of plaque forming units (pfu) is also shown in Table 1. The vials were agitated in a flip-flop manner for 10 cycles, after the addition of the two milliliter sample. After agitation, the vials were incubated at room temperature for 5 minutes and then at 37° C. air temperature for 5 minutes. $100\lambda$ sample counts were then taken on the Coulter Counter. All settings remained the same with the exception of the threshold value which was varied. By varying the threshold level, one changes the sensitivity of the Counter. At higher threshold levels the Counter registers only larger aggregates. By varying the setting, therefore, one can obtain an indication of the agglutination or aggregate pattern which has occurred due to the addition of the virus. Each sample vial was counted ten times and an average count is shown in Table 2 in the Appendix. From the data it is apparent that different numbers of virus particles produce different aggregate patterns.

EXAMPLE II

To observe the change in the Coulter count pattern and obtain a record of the latex agglutination or aggregate pattern response to known amounts of virus, the following experiment was performed. A diluted latex suspension, as in Example I, was employed. To establish a normal or base line curve for the latex, 10 sample vials, each containing 20 ml. of the diluted latex suspension, were diluted further with 2 ml. of Isoton pH 7.4. Each vial was mixed for 10 cycles in a flip-flop manner. Immediately after agitation, the vial was counted at the same instrument settings and using the same sample size employed in Example I. Three counts at each thershold setting, 1 through 9, were made for each of the ten vials. At higher threshold settings the change in count was not significant enough to warrant 30 measurements. The results of the counts are shown in Table 3 in the appendix.

Next, sample vials were again prepared containing 20 ml. of the latex suspension. As indicated in the tables, WEE virus (undiluted: $3.2 \times 10^8$ $LD_{50}/0.02$ ml. [Reed-Mueuch Method]) or Wee Antibody (titre: 10240/0.025 ml. HAI), were added to sample vials in dilutions of the original antibody (Ab) or virus as indicated. One milliliter of diluted virus or Ab and one milliliter of Isoton was added to each sample vial. The 22 ml. suspensions were then mixed for 10 cycles in a flip-flop manner and allowed to sit at room temperature for five minutes. Next they were placed in a 37° C. incubator for five minutes, again agitated for 10 cycles and immediately counted, using the same instrument settings and sample sizes as those employed to establish the base line curve. The results are shown in the appendix in Tables 4–12. A statistically significant level of counts were observed when virus or Ab was added to the latex suspension. The significance observed was at two levels—0.05 and 0.01. Significance was determined by the $t$ test with unequal variance and unequal sample size. For the tests, three sample vials at each dilution were employed, and generally three or more counts at each threshold level were taken for each sample.

Analyzing the data in Tables 4–12 in the following manner allows one to characterize the induced aggregates as a functon of the quality and quantity of virus or Ab. At threshold zero, latex control (see Table 3) gave 34,436 counts. At threshold one, latex control gave 27,771 counts. The difference is 6,665 counts. At threshold zero, latex plus a 1:10 dilution of Wee virus gave 31,992 counts. At threshold one, the same dilution gave 27,931 counts (see Table 4). The difference is 4,061. The data is now further analyzed by taking a difference of difference or change in aggregate count. In other words, from threshold zero to one, the latex control changed 6,665 counts; the virus-added sample changed 4,061 counts. The difference of difference is 6,665−4,061=2,604 counts. Because counts have been lost, a negative sign is given to the change in aggregate count for purposes of graphing. If counts were gained between threshold settings, the change in aggregate count would be given a positive sign.

Change in aggregate count versus threshold interval can be plotted on a graph to give a visual representation of what occurs when various numbers and types of aggregate inducing substances are added to a latex control. The latex control line may be drawn as zero to show the fluctuation or change from control after the aggregates have been produced. These graphical representations are actually signatures produced by a specific type and quantity of virus particles. Latex counts for an unknown sample can be visually compared with signatures of samples having a known amount and type of virus or antibody to determine the quantity and quality of particles or molecules in an unknown sample.

Rather than employ a visual-graphical method of comparing counts for known and unknown samples, the data in the above tables could be stored; and a properly programmed computer could make statistical comparisons of data for an unknown sample with data for known types and quantities of viruses or antibodies to determine the number and type of particles or molecules in the unknown sample. Elimination of the visual comparison test would allow automation of the technique.

EXAMPLE III

By employing the known specificity of the virus-antibody reaction, one can reduce the time it takes to compare and make qualitative determinations regarding the type of virus or antibody in an unknown sample. To illustrate this procedure the following test was completed. A 1:20,000 dilution of 5% solid in Isoton pH 7.4 of polyvinyl toluene, latex particles, having a $2.02\mu$ diameter was employed. In addition, the same virus and antibody as in Example II were used. Table 8, was used to establish a base line curve. Two sample vials were prepared by first adding one milliliter of WEE Ab diluted 1:10, and then adding one milliliter of virus diluted as indicated in Tables 13 and 14 in the appendix.

After mixing and incubation as in Example II, counts were made on the Coulter Counter. The results are shown in Tables 13 and 14. A comparison of these tables and Table 8 reveals the change in aggregate patterns caused by the addition of a virus, when the latex particles are precoated with a known Ab.

The specificity of the Ab-virus reaction will allow more rapid identification of the virus by reducing the number of qualitative, determinative comparisons that must be made. Graphs of change in aggregate count versus threshold interval, or computer comparisons of data for known samples could be employed to determine the number of virus particles in the unknown sample as in Example II. As would be apparent to those skilled in the art, the procedure could be reversed, by first precoating the latex particles with a virus.

EXAMPLE IV

Another way to reduce the number of comparisons that must be made with data for known samples for qualitative determinations is to attempt to tag the unknown particles or molecules with a fluorescently tagged enzyme. To illustrate the possible reduction in time to recognize a specific aggregate pattern, the following experiment was carried out.

7.5 ml. of a 1:200 dilution of latex particles, $2.02\mu$ diameter and $3.0 \times 10^8$ particles/7.5 ml., was introduced into each of eight centrifuge tubes. For a control, 7.5 ml. of a phosphate buffered saline (PBS) pH 7.3 was introduced into a ninth tube. As indicated in Table 15 in the appendix, one milliliter of virus of differing concentrations was added to each of the tubes. An additional 0.5 ml. of ether, formaldehyde, or PBS was added, as indicated, to bring the volume of fluid in each tube to nine milliliters, and the solution was allowed to react for five minutes at room temperature.

Next, one milliliter of RNase (3,333.3 units/ml. in a 1:10 dilution) was added to each of the nine tubes at 30 second intervals and allowed to react. Since the reaction between the enzyme and the virus—Influenza $A_2$/Hong Kong Strain $6.5 \times K^6$ to 6.5 to $10^8$ virus particles/ml.—used in this example was time dependent, care was taken to assure that equal reaction times were allowed for each tube. After the enzyme in each tube had been allowed to react for five minutes, each tube was placed in $H_2O$ ice to arrest the reaction. After 30 seconds in the ice the tubes were centrifuged for 30 minutes at 25,000 r.p.m. Tubes 1–8 were then removed from the centrifuge, and the supernatant liquid was removed by inserting a long needle through a small opening in the centrifuge cap and extracting the liquid with a syringe. The remaining latex particles were then resuspended in 10 ml. of PBS, and readings on a fluorometer of both the latex suspension and supernatant liquid were made, the results of which are shown in Table 16.

The results clearly indicate that viruses adsorbed to latex particles can be tagged with an enzyme which itself has been tagged with a fluorescent molecule, in this case fluorescein isothiocyanate. Since specific enzymes will react with only certain classes of viruses, the possibilities regarding the type of virus in an unknown sample can be materially reduced by this step. The number of aggregate latex pattern comparisons to determine the type of virus can thus be reduced. Once the virus has been typed, the sizes of aggregates and their numbers can be compared with known samples to determine the number of virus particles in an unknown sample, as described above.

Furthermore, if a more sensitive fluorometer were employed, its readings could be compared with readings for known quantities of a typed virus to provide a double check on the latex agglutination comparison results, regarding the quantity of virus particles in an unknown sample.

It should be further noted that particles other than polyvinyl toluene and particles of different sizes may be employed in the method, provided they are uniform in diameter to ensure reproducible results and the virus particles or antibody molecules can adsorb to their surfaces. In addition, methods and devices other than the Coulter Counter may be employed to sense aggregate sizes and patterns.

Obviously, many modifications and variations of the present invention are possible in light of the above teachings. It is therefore to be understood that, within the scope of the appended claims, the invention may be practiced otherwise than as specifically described.

TABLE 1

| Vial number | 1 | 2 | 3 | 4 | 5 | 6 |
|---|---|---|---|---|---|---|
| Initial counts | 41,932 | 46,656 | 39,988 | 41,600 | 41,357 | 41,559 |
|  | 42,351 | 42,605 | 40,033 | 43,385 | 41,663 | 41,481 |
|  | 42,504 | 42,945 | 39,411 | 43,210 | 41,154 | 41,312 |
| Average count | 42,262 | 44,068 | 39,810 | 42,731 | 41,391 | 41,450 |
| Variable, 2 ml | Isoton | (1) | WEE | WEE | WEE | WEE |
| WEE, pfu/0.2 ml | 0 | 0 | $2.5 \times 10^{3.3}$ | $1.25 \times 10^{3.3}$ | $6.25 \times 10^{2.3}$ | $3.125 \times 10^{3.2}$ |
| WEE, total pfu | 0 | 0 | 49,875 | 24,937 | 12,468 | 6,234 |

[1] Glycine-saline buffer pH 8.3.

TABLE 2

Average count

| Vial number | 1 | 2 | 3 | 4 | 5 | 6 |
|---|---|---|---|---|---|---|
| Threshold value: |  |  |  |  |  |  |
| 0 | 38,698 | 37,786 | 34,346 | 37,936 | 37,499 | 37,169 |
| 1 | 32,174 | 31,067 | 30,402 | 32,022 | 31,074 | 31,930 |
| 2 | 20,482 | 19,407 | 16,371 | 21,086 | 20,434 | 21,192 |
| 3 | 11,261 | 11,126 | 9,104 | 11,132 | 11,145 | 11,023 |
| 4 | 8,527 | 7,830 | 6,624 | 8,170 | 8,528 | 8,527 |
| 5 | 6,027 | 5,255 | 4,458 | 5,267 | 5,876 | 5,636 |
| 6 | 4,203 | 3,143 | 2,981 | 3,292 | 3,823 | 3,797 |
| 7 | 3,231 | 2,441 | 2,322 | 2,360 | 2,869 | 2,794 |
| 8 | 2,294 | 1,640 | 1,617 | 1,864 | 1,997 | 2,027 |
| 9 | 1,901 | 1,360 | 1,262 | 1,526 | 1,492 | 1,412 |
| 10 | 1,444 | 952 | 875 | 1,076 | 1,072 | 1,042 |
| 11 | 1,222 | 772 | 690 | 884 | 859 | 831 |
| 12 | 1,045 | 638 | 598 | 659 | 686 | 664 |
| 13 | 936 | 445 | 417 | 484 | 513 | 524 |
| 14 |  | 329 | 353 | 352 | 469 | 416 |
| 15 |  |  | 230 | 201 | 346 | 353 |

TABLE 3

Latex control

| Threshold (T) | Mean | Standard deviation | Number of counts |
|---|---|---|---|
| 0 | 34,436 | 961 | 30 |
| 1 | 27,771 | 1,188 | 30 |
| 2 | 17,594 | 1,332 | 30 |
| 3 | 10,024 | 643 | 31 |
| 4 | 7,531 | 466 | 30 |
| 5 | 5,147 | 370 | 30 |
| 6 | 3,663 | 185 | 30 |
| 7 | 2,626 | 182 | 30 |
| 8 | 1,727 | 121 | 30 |
| 9 | 1,471 | 147 | 30 |
| 10 | 1,064 | 100 | 29 |
| 11 | 835 | 49 | 25 |
| 12 | 649 | 35 | 16 |
| 13 | 514 | 54 | 15 |
| 14 | 480 | 45 | 11 |
| 15 | 402 | 79 | 8 |

TABLE 4

Latex plus $10^{-1}$ dilution WEE virus

| T | Mean | Standard deviation | Number of counts | Statistical significance |
|---|---|---|---|---|
| 0 | 31,992 | 1,338 | 9 | **5.099 |
| 1 | 27,931 | 1,717 | 9 | −.261NS |
| 2 | 17,469 | 836 | 9 | .337NS |
| 3 | 10,176 | 1,060 | 9 | −.409NS |
| 4 | 8,032 | 512 | 9 | *−2.627 |
| 5 | 5,325 | 355 | 9 | −1.306NS |
| 6 | 3,845 | 204 | 9 | *−2.397 |
| 7 | 2,871 | 274 | 9 | *−2.521 |
| 8 | 2,065 | 209 | 9 | **−4.625 |
| 9 | 1,589 | 139 | 9 | −2.204NS |
| 10 | 1,144 | 129 | 9 | −1.708NS |
| 11 | 931 | 149 | 9 | −1.896NS |
| 12 | 793 | 121 | 9 | **−3.489 |
| 13 | 598 | 71 | 9 | *−3.058 |
| 14 | 543 | 59 | 9 | *−2.637 |
| 15 | 417 | 68 | 9 | −.417NS |

NOTE.—*=.05 level.  **=.01 level.

TABLE 5

Latex plus $10^{-2}$ dilution WEE virus

| T | Mean | Standard deviation | Number of counts | Statistical significance |
|---|---|---|---|---|
| 0 | 29,461 | 584 | 9 | **5.201 |
| 1 | 23,983 | 392 | 9 | **6.725 |
| 2 | 15,695 | 539 | 9 | *3.350 |
| 3 | 9,136 | 136 | 9 | *2.919 |
| 4 | 7,055 | 222 | 9 | **5.252 |
| 5 | 4,813 | 201 | 9 | **3.765 |
| 6 | 3,583 | 180 | 9 | *2.889 |
| 7 | 2,749 | 49 | 9 | 1.315NS |
| 8 | 1,752 | 64 | 9 | **4.296 |
| 9 | 1,543 | 64 | 9 | .902NS |
| 10 | 1,141 | 52 | 9 | .065NS |
| 11 | 907 | 46 | 11 | .465NS |
| 12 | 747 | 41 | 9 | 1.080NS |
| 13 | 555 | 38 | 9 | 1.062NS |
| 14 | 471 | 50 | 9 | *2.793 |
| 15 | 364 | 21 | 9 | *2.334 |

For footnotes, see Table 4.

TABLE 6

Latex plus $10^{-3}$ dilution WEE virus

| T | Mean | Standard deviation | Number of counts | Statistical significance |
|---|---|---|---|---|
| 0 | 29,543 | 563 | 9 | −.303NS |
| 1 | 25,866 | 2,004 | 8 | *−2.613 |
| 2 | 16,396 | 660 | 9 | *−2.468 |
| 3 | 9,375 | 332 | 9 | −1.998NS |
| 4 | 7,003 | 137 | 9 | .598NS |
| 5 | 4,971 | 148 | 9 | −1.899NS |
| 6 | 3,493 | 154 | 9 | 1.140NS |
| 7 | 2,646 | 60 | 9 | **3.989 |
| 8 | 1,838 | 136 | 9 | −1.716NS |
| 9 | 1,548 | 76 | 9 | −.151NS |
| 10 | 1,130 | 39 | 9 | .508NS |
| 11 | 918 | 31 | 11 | −.359NS |
| 12 | 748 | 30 | 10 | −.060NS |
| 13 | 550 | 24 | 9 | .334NS |
| 14 | 468 | 27 | 9 | .158NS |
| 15 | 349 | 18 | 9 | 1.627NS |

For footnotes, see Table 4.

TABLE 7

Latex plus $10^{-4}$ dilution WEE virus

| T | Mean | Standard deviation | Number of counts | Statistical significance |
|---|---|---|---|---|
| 0 | 30,923 | 861 | 9 | **−4.024 |
| 1 | 26,654 | 2,351 | 9 | −.076NS |
| 2 | 16,737 | 731 | 10 | −1.068NS |
| 3 | 9,622 | 310 | 9 | −1.631NS |
| 4 | 7,082 | 247 | 10 | −.873NS |
| 5 | 5,021 | 271 | 10 | −.506NS |
| 6 | 3,531 | 88 | 9 | −.643NS |
| 7 | 2,692 | 98 | 9 | −1.201NS |
| 8 | 1,875 | 165 | 9 | −.519NS |
| 9 | 1,490 | 123 | 10 | 1.250NS |
| 10 | 1,058 | 89 | 9 | 2.223NS |
| 11 | 921 | 24 | 6 | −.591NS |
| 12 | 725 | 22 | 6 | 1.76NS |
| 13 | 556 | 35 | 6 | −.366NS |
| 14 | 456 | 25 | 6 | .882NS |
| 15 | 350 | 34 | 6 | −.066NS |

For footnotes, see Table 4.

TABLE 8

Latex plus $10^{-1}$ dilution WEE antibody

| T | Mean | Standard deviation | Number of counts | Statistical significance |
|---|------|---------|---------|---------|
| 0 | 32,624 | 846 | 10 | ** 5.664 |
| 1 | 27,397 | 1,498 | 10 | .718NS |
| 2 | 17,988 | 346 | 9 | −1.464NS |
| 3 | 10,945 | 552 | 9 | ** −4.240 |
| 4 | 8,133 | 150 | 9 | ** −6.100 |
| 5 | 5,929 | 209 | 9 | ** −8.058 |
| 6 | 4,260 | 295 | 10 | ** −6.017 |
| 7 | 3,280 | 135 | 9 | ** −11.691 |
| 8 | 2,406 | 121 | 9 | ** −14.765 |
| 9 | 1,990 | 75 | 10 | ** −14.491 |
| 10 | 1,464 | 69 | 10 | ** −13.961 |
| 11 | 1,220 | 73 | 9 | ** −14.676 |
| 12 | 1,020 | 55 | 9 | ** −18.263 |
| 13 | 781 | 44 | 9 | ** −13.194 |
| 14 | 673 | 39 | 9 | ** −10.271 |
| 15 | 523 | 23 | 6 | ** −4.106 |

For footnotes, see Table 4.

TABLE 9

Lgrex plus $10^{-2}$ dilution WEE antibody

| T | Mean | Standard deviation | Number of counts | Statistical significance |
|---|------|---------|---------|---------|
| 0 | 28,584 | 372 | 9 | **13.702 |
| 1 | 24,772 | 1,576 | 9 | **3.789 |
| 2 | 15,472 | 210 | 9 | **18.64 |
| 3 | 9,564 | 338 | 10 | **6.490 |
| 4 | 7,073 | 438 | 9 | **6.869 |
| 5 | 4,635 | 225 | 9 | **12.641 |
| 6 | 3,328 | 138 | 9 | **8.961 |
| 7 | 2,505 | 69 | 9 | **15.335 |
| 8 | 1,755 | 82 | 9 | **13.361 |
| 9 | 1,525 | 18 | 9 | 19.007 |
| 10 | 1,083 | 34 | 9 | **15.496 |
| 11 | 871 | 46 | 9 | **12.134 |
| 12 | 726 | 39 | 9 | **13.081 |
| 13 | 536 | 32 | 9 | **13.510 |
| 14 | 454 | 23 | 6 | **13.656 |
| 15 | 348 | 22 | 6 | **3.468 |

For footnotes, see Table 4.

TABLE 10

Latex plus $10^{-3}$ dilution WEE antibody

| T | Mean | Standard deviation | Number of counts | Statistical significance |
|---|------|---------|---------|---------|
| 0 | 27,944 | 650 | 10 | *2.666 |
| 1 | 23,129 | 388 | 9 | **2.944 |
| 2 | 14,980 | 235 | 10 | **4.819 |
| 3 | 8,691 | 524 | 9 | **4.263 |
| 4 | 6,226 | 184 | 10 | **5.389 |
| 5 | 4,295 | 86 | 10 | **4.262 |
| 6 | 3,307 | 280 | 9 | .202NS |
| 7 | 2,286 | 68 | 9 | **6.782 |
| 8 | 1,681 | 168 | 10 | 1.239NS |
| 9 | 1,369 | 71 | 9 | **6.389 |
| 10 | 990 | 68 | 10 | **3.826 |
| 11 | 788 | 50 | 9 | **3.665 |
| 12 | 661 | 47 | 9 | **3.193 |
| 13 | 496 | 41 | 9 | *2.307 |
| 14 | 430 | 18 | 9 | 2.154NS |
| 15 | 319 | 36 | 10 | 2.00NS |

For footnotes, see Table 4.

TABLE 11

Latex plus $10^{-4}$ dilution WEE antibody

| T | Mean | Standard deviation | Number of counts | Statistical significance |
|---|------|---------|---------|---------|
| 0 | 31,000 | 590 | 9 | ** −10.742 |
| 1 | 26,189 | 995 | 9 | ** −8.596 |
| 2 | 16,173 | 378 | 9 | ** −8.155 |
| 3 | 8,687 | 181 | 9 | .022NS |
| 4 | 6,681 | 86 | 9 | ** −7.015 |
| 5 | 4,704 | 118 | 9 | − **8.553 |
| 6 | 3,218 | 98 | 9 | .900NS |
| 7 | 2,417 | 58 | 9 | ** −4.397 |
| 8 | 1,718 | 114 | 9 | −.566NS |
| 9 | 1,334 | 50 | 9 | 1.209NS |
| 10 | 986 | 55 | 9 | .142NS |
| 11 | 800 | 32 | 9 | −.606NS |
| 12 | 657 | 25 | 9 | .225NS |
| 13 | 508 | 43 | 10 | −.622NS |
| 14 | 431 | 21 | 10 | −.112NS |
| 15 | 320 | 12 | 12 | −.084NS |

For footnotes, see Table 4.

TABLE 12

Latex plus $10^{-5}$ dilution WEE antibody

| T | Mean | Standard deviation | Number of counts | Statistical significance |
|---|------|---------|---------|---------|
| 0 | 29,852 | 678 | 9 | **3.831 |
| 1 | 24,336 | 577 | 9 | **4.833 |
| 2 | 15,395 | 354 | 9 | **4.507 |
| 3 | 8,511 | 315 | 10 | 1.511NS |
| 4 | 6,274 | 366 | 11 | **3.570 |
| 5 | 4,407 | 138 | 9 | **4.907 |
| 6 | 3,056 | 155 | 9 | *2.650 |
| 7 | 2,248 | 37 | 9 | **7.370 |
| 8 | 1,489 | 99 | 9 | **4.550 |
| 9 | 1,257 | 52 | 9 | **3.202 |
| 10 | 918 | 47 | 9 | *2.820 |
| 11 | 738 | 30 | 9 | **4.240 |
| 12 | 601 | 25 | 9 | **4.752 |
| 13 | 482 | 20 | 9 | 1.717NS |
| 14 | 401 | 14 | 9 | **3.696 |
| 15 | 308 | 20 | 12 | 1.782NS |

For footnotes, see Table 4.

TABLE 13

Latex plus $10^{-1}$ dilution WEE antibody plus $10^{-1}$ dilution WEE virus

| T | Mean | Standard deviation | Number of counts | Statistical significance |
|---|------|---------|---------|---------|
| 0 | 33,743 | 46 | 3 | ** −4.162 |
| 1 | 27,217 | 155 | 3 | .373NS |
| 2 | 18,525 | 355 | 3 | −2.283NS |
| 3 | 10,780 | 148 | 3 | .813NS |
| 4 | 8,411 | 113 | 3 | * −3.388 |
| 5 | 6,016 | 84 | 3 | −1.025NS |
| 6 | 4,439 | 51 | 3 | −1.830NS |
| 7 | 3,497 | 46 | 3 | * −4.153 |
| 8 | 2,635 | 80 | 3 | * −3.734 |
| 9 | 2,090 | 30 | 4 | * −3.563 |
| 10 | 1,646 | 50 | 3 | ** −5.030 |
| 11 | 1,277 | 69 | 3 | −1.221NS |
| 12 | 1,168 | 35 | 3 | ** −5.424 |
| 13 | 927 | 48 | 4 | ** −5.191 |
| 14 | 832 | 10 | 3 | ** −11.178 |
| 15 | 645 | 54 | 5 | ** −4.708 |

For footnotes, see Table 4.

TABLE 14

Latex plus $10^{-1}$ dilution WEE antibody plus $10^{-2}$ dilution WEE virus

| T | Mean | Standard deviation | Number of counts | Statistical significance |
|---|------|---------|---------|---------|
| 0 | 28,963 | 227 | 3 | −2.101NS |
| 1 | 24,150 | 164 | 3 | 1.072NS |
| 2 | 15,563 | 262 | 3 | −.546NS |
| 3 | 8,344 | 74 | 3 | **10.599 |
| 4 | 6,424 | 73 | 4 | **4.312 |
| 5 | 4,265 | 77 | 4 | **4.389 |
| 6 | 3,089 | 36 | 3 | **4.735 |
| 7 | 2,314 | 17 | 3 | **7.638 |
| 8 | 1,531 | 20 | 3 | **7.549 |
| 9 | 1,417 | 25 | 3 | **6.999 |
| 10 | 1,041 | 30 | 3 | 2.029NS |
| 11 | 874 | 28 | 3 | −.135NS |
| 12 | 731 | 11 | 3 | −.346NS |
| 13 | 566 | 10 | 3 | * −2.473 |
| 14 | 487 | 17 | 3 | * −2.429 |
| 15 | 392 | 24 | 4 | * −2.859 |

For footnotes, see Table 4.

TABLE 15

| Tube number | Latex (ml.) | Enzyme (ml.) | Virus (ml.) | Virus count** | Pretreatment 0.5 ml. of— |
|---|---|---|---|---|---|
| 1 | 7.5 | 1.0 | 1.0 | 6.5×10⁸ | PBS, pH 7.3. |
| 2 | 7.5 | 1.0 | 1.0 | 6.5×10⁸ | Ether. |
| 3 | 7.5 | 1.0 | 1.0 | 6.5×10⁸ | Do. |
| 4 | 7.5 | 1.0 | 1.0 | 6.5×10⁸ | Formaldehyde. |
| 5 | 7.5 | 1.0 | 1.0 | 6.5×10⁸ | Do. |
| 6 | 7.5 | 1.0 | 1.0 | 6.5×10⁷ | Ether. |
| 7 | 7.5 | 1.0 | 1.0 | 6.5×10⁶ | Do. |
| 8 | 7.5 | 1.0 | 1.0 | 6.5×10⁷ | Formaldehyde. |
| 9 | *0 | 1.0 | 1.0 | 6.5×10⁸ | PBS, pH 7.3. |

*7.5 ml. of PBS, pH 7.3 was placed in tube 9, 0.2 M.
**Electron microscope count of Influenza $A_2$/Hong Kong strain virus particles.

TABLE 16

| Tube number | Fluorescent reading (30×) | | |
|---|---|---|---|
| | Particles | Supernatant | Total |
| 1 | 23.5 | 40.0 | 63.5 |
| 2 | 23.0 | 41.8 | 64.8 |
| 3 | 27.5 | 45.0 | 72.5 |
| 4 | 29.0 | 45.0 | 74.0 |
| 5 | 27.2 | 40.0 | 67.2 |
| 6 | 27.0 | 42.0 | 69.0 |
| 7 | 23.6 | 42.0 | 65.6 |
| 8 | 24.8 | 40.0 | 64.8 |
| 9 | | 39.2 | 39.2 |

What is claimed is:

1. A method of identifying and counting entities from the group consisting of virus particles and antibody molecules comprising the steps of:
   placing a quantity of a sample containing an unknown type and quantity of said entities into a suspension, said suspension containing a predetermined amount of virus and antibody adsorbing particles of uniform size;
   mixing the suspension;
   measuring the sizes and numbers of aggregates produced in said suspension; and
   comparing the sizes and numbers of aggregates produced with data for known types and quantities of said entities to determine the type and quantity of said entities in said sample.

2. The method of claim 1 wherein the virus and antibody adsorbing particles are polyvinyl toluene.

3. The method of claim 1 further including the step of incubating the suspension before measuring the sizes and numbers of aggregates.

4. The method of claim 1 including the further step of precoating the virus and antibody adsorbing particles with a known virus before placing the unknown sample into the suspension.

5. The method of claim 4 including the further step of incubating the suspension before measuring the sizes and numbers of aggregates.

6. The method of claim 5 wherein the virus and antibody adsorbing particles are polyvinyl toluene.

7. The method of claim 1 including the further step of precoating the virus and antibody adsorbing particles with a known antibody before placing the unknown sample into the suspension.

8. The method of claim 7 including the further step of incubating the suspension before measuring the sizes and numbers of aggregates.

9. The method of claim 8 wherein the virus and antibody adsorbing particles are polyvinyl toluene.

10. The method of claim 1 comprising the further steps of:
    placing the same quantity of said sample into a second suspension, containing a predetermined amount of uniform size, virus and antibody adsorbing particles;
    adding a fluorescently tagged enzyme to said second suspension;
    allowing said second suspension to react for a predetermined time period;
    centrifuging said second suspension;
    removing the supernatant liquid from said second suspension;
    resuspending said virus and antibody adsorbing particles in a predetermined quantity of solution;
    measuring the fluorescence of the resuspended virus and antibody adsorbing particles; and
    comparing the fluorescent readings to readings for known quantities of the type of entity contained in the sample to double-check the quantity determination arrived at by using aggregate comparisons.

References Cited

UNITED STATES PATENTS

| | | | |
|---|---|---|---|
| 3,088,875 | 5/1963 | Fisk | 195—103.5 R |
| 3,658,982 | 4/1972 | Reiss et al. | 424—12 |
| 3,678,148 | 7/1972 | Caiola | 23—230 B |
| 3,690,832 | 9/1972 | Plakas | 23—230 B |
| 3,564,089 | 2/1971 | Kiddy | 424—12 X |
| 3,777,014 | 12/1973 | Zichis | 424—12 |

MORRIS O. WOLK, Primary Examiner

T. W. HAGAN, Assistant Examiner

U.S. Cl. X.R.

195—103.5 R; 424—12